United States Patent [19]

Rockett et al.

[11] Patent Number: 4,609,580
[45] Date of Patent: Sep. 2, 1986

[54] ABSORBENT FLOOR MAT

[75] Inventors: Luann T. Rockett, Norcross; David A. Nielsen, Roswell; Peter W. Shipp, Jr., Woodstock, all of Ga.; Greggory I. Knopp, Gillingham, England

[73] Assignee: Kimberly-Clark Corporation, Neenah, Wis.

[21] Appl. No.: 689,421

[22] Filed: Jan. 7, 1985

[51] Int. Cl.⁴ ............................................. D04H 1/00
[52] U.S. Cl. .................... 428/198; 428/288; 428/297; 428/303; 428/340
[58] Field of Search ............... 428/198, 288, 297, 303, 428/340, 82

[56] References Cited

U.S. PATENT DOCUMENTS

| | | | |
|---|---|---|---|
| 3,856,610 | 12/1974 | Bruneel | 428/76 |
| 4,100,324 | 7/1978 | Anderson et al. | 428/297 X |
| 4,125,656 | 11/1978 | Creamer | 428/181 X |
| 4,143,194 | 3/1979 | Wihksne | 428/194 X |
| 4,285,075 | 8/1981 | Nelson | 4/252 A |
| 4,374,888 | 2/1983 | Bornslaeger | 428/198 |
| 4,377,610 | 3/1983 | McClung, Jr. | 428/90 X |
| 4,421,809 | 12/1983 | Bish et al. | 428/90 |
| 4,439,474 | 3/1984 | Sagel | 428/90 |
| 4,469,734 | 9/1984 | Minto et al. | 428/326 X |
| 4,482,593 | 11/1984 | Sagel et al. | 428/90 |

*Primary Examiner*—Henry F. Epstein
*Attorney, Agent, or Firm*—William D. Herrick

[57] ABSTRACT

A floor mat having costs of manufacture consistent with disposability and yet extended properties. The mat comprises a combination of a continuous filament nylon nonwoven wear surface, and absorbent inner layer comprising a mixture of polymeric microfibers and wood pulp, and a liquid impervious film backing layer. The combination is intermittently bonded such as by means of sonic energy and preferably has means for positioning and retaining the mat on a floor surface. Such means may include a holder device or tacky adhesive applied to the bottom film surface. In use the floor mat of the invention may be printed for decorative or promotional purposes and is sufficiently durable to last up to several weeks under high use conditions while yet being economical to produce. Applications for the floor mat include many consumer and industrial situations where protection from inclement weather is desired as well as in industrial clean rooms, laboratories and hospitals.

9 Claims, 2 Drawing Figures

ABSORBENT FLOOR MAT

BACKGROUND OF THE INVENTION

1. Field of the Invention

The present invention is directed to mats useful for protecting floor surfaces from being soiled by contact with dirty liquids or other sources of dirt or contamination. Such mats are useful at entryways to buildings to collect soil and as protection from the elements as well as useful in hallways between factories and offices, entrances to laboratories, industrial clean rooms, and the like. Furthermore, such mats will be useful in association with likely spill areas such as locations for vending machines or other beverage dispensers. In particular, the present invention is directed to such mats that are highly effective and yet can be produced and marketed at a cost consistent with disposability. In addition the present invention is directed to means for placement of such mats including holders and other means for retaining the mat in position.

2. Description of the Prior Art

Protective floor mats are well-known and have found widespread application. In general, the mats are either durable and relatively costly or paper-like and intended to be discarded after a brief period of use. Examples of the former range from carpeting, throw rugs, and other woven or tufted fabric mats while the latter types principally are made of paper-like materials such as are commonly found in new automobiles or runners used in protecting carpeting in newly constructed housing. There have, however, been investigated other structures designed for applications having somewhat more demanding requirements but where disposability or limited use require low costs. For example, U.S. Pat. No. 3,856,610 to Bruneel dated Dec. 24, 1974 describes a floor mat having an absorbent body portion which may be a woven or nonwoven fibrous fabric, fiberboard, paperboard, cotton or the like that is contained within a liquid impervious skin. The skin is perforated on the upper surface to permit liquid to pass through and into a series of aligned pores in the body member. It is alleged that liquid and small particles become entrapped in the pores and retained. U.S. Pat. No. 4,421,809 to Bish, Sagel and Trinh dated Dec. 20, 1983 describes a floor mat having a flocked surface that is bonded by means of a hydrophilic adhesive to an impermeable polymeric film. This combination may be further bonded to an absorbent secondary backing which may have an adhesive surface for improved hard floor stability. This structure may include a nonwoven primary backing in place of the film, but the film is preferred to maintain a thin structure. U.S. Pat. No. 4,143,194 to Wihksne dated Mar. 6, 1979 describes a disposable floor mat and holder combination wherein the mat may constitute tacky sheets, and the holder has means for reinforcing bevelled surfaces and may include interlocking means for combining mats to produce a larger surface. U.S. Pat. No. 4,285,075 to Nelson dated Aug. 25, 1981 is directed to a commode mat having a holder and absorbent mat. The absorbent mat may comprise a diaper-like construction with a nonwoven outer surface and film backing. However, grill work is provided as a top wear surface and is part of the holder structure.

In spite of these teachings, there is not commercially available, as far as is known, a floor mat that is sufficiently durable for use at entryways and the like without a grill work structure and yet is sufficiently low cost that its use may be consistent with disposability. Such a mat would avoid the high cost of woven and other relatively permanent structures and provide effective service. Furthermore, such a mat having a relatively limited life that could be used for advertising and promotional purposes is desired if available at a sufficiently low cost that it could be frequently changed.

SUMMARY OF THE INVENTION

The present invention is directed to a floor mat having an improved construction including a durable nonwoven wear surface, a highly absorbent inner layer, and a liquid impervious bottom surface. The combination, while capable of being produced at a relatively low cost consistent with disposability, provides a highly durable and absorbent product that can be used over an extended period compared with conventional more paper-like protective mats. The absorbent material is a fast-wicking microfiber web and preferably is a combination of thermoplastic polymeric microfibers and wood pulp fibers that not only is highly absorbent for both water and oil based liquids, but has a strong tendency to retain such materials and keep them from being redistributed on subsequent contact with the wear surface. The result of such combination is a highly effective floor mat that is inexpensive and suitable for many applications including building entryways, vending machine areas, clean rooms, hospitals, industrial laboratories, and the like. Preferred embodiments for the wear surface include chemically bonded continuous filament webs, and preferred embodiments for the impervious film include films of polyolefins such as polypropylene and polyethylene. The combination is preferably bonded by a pattern application of sonic energy or heat and pressure. In use the mat may be retained in place by means of adhesive applied to the impervious backing, or by means of a holder which is relatively permanent as compared with the mats which are intended to be changed from time to time depending on the extent of use.

Figure 1:
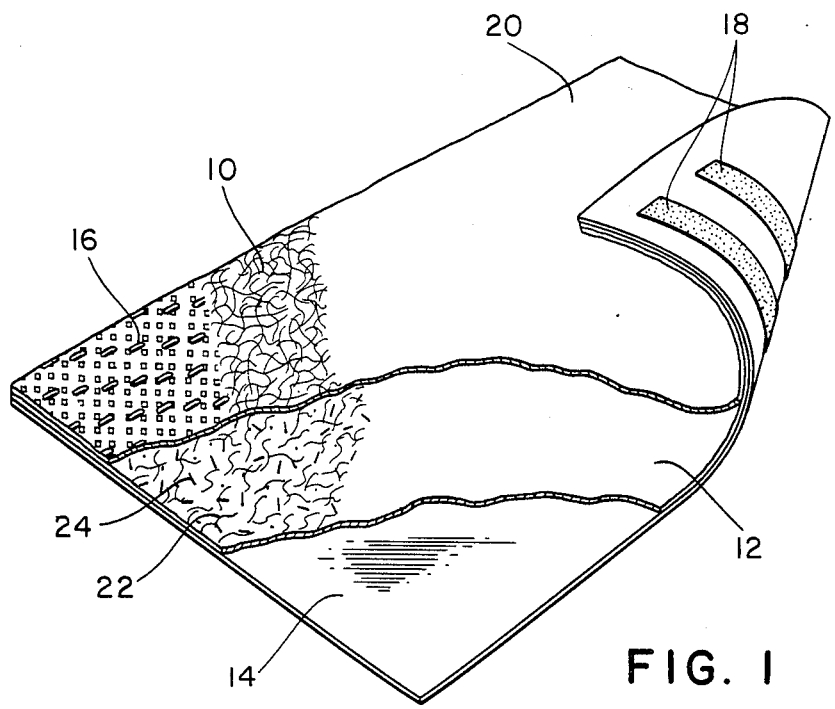
FIG. 1 is an illustration shown in partial cross-section of a mat in accordance with the present invention.

The abrasion-resistant wear surface in accordance with the invention is preferably a chemically, overall bonded continuous filament web. Such webs of nylon are available, for example, under the trademark Cerex ® from Monsanto. It is important that the wear surface be highly resistant to abrasion and impart durability to the structure. Webs that are solution spun, solvent treated, or bonded by other chemical means are preferred for appearance purposes and for increased durability. While the basis weight of this wear layer may vary, for example, broadly within the range of about 15 to 200 grams per square meter, it is preferably within the range of about 50 to 70 grams per square meter. In order to satisfy the requirements of the present invention, the continuous filament wear layer web must have an abrasion resistance of at least about 3½ hours and preferably at least about 5 hours as measured by a modification of the Tetrapod Walker Test which simulates flat floor traffic.

In accordance with this procedure, a plastic canister of 8.5 inches diameter and 8.5 inches length was fitted with rubber strips wrapped outside its circumference. A tetrapod was formed by welding together at equal angles four ¼ inch screws three inches in length in the configuration of a large "jack". A neoprene #7 stopper was attached to each screw, and a lead weight attached to the vertex to make the final weight 1.1 Kg. To carry out the test, a section of mat material 8.5 inches by 24.75 inches was placed securely about the inner circumference of the canister. The tetrapod was then placed in the canister and the lid secured. The canister was placed on its side on a roller mill and the speed adjusted to 60 rpm. The sample was checked at ¼ or ½ hour intervals for holes, rips or snags.

In addition, the wear surface, in accordance with the invention, will have a porosity in the range of from at least about 100 cubic feet per minute, preferably at least about 200 cubic feet per minute as measured using a Frazier Air-Permeability tester (Frazier Precision Instrument Company). To achieve desired integrity, the porosity normally will not exceed about 500 cubic feet per minute, however. In accordance with this procedure, a sample of sufficient size to extend several inches over all sides of the retaining ring was placed over the orifice having a diameter of 2.75 inches. The retaining ring was fitted in position, and the clamp lowered and tightened. The power was adjusted until the inclined manometer oil column reached 0.5. When the inclined manometer had steadied at the proper level, a reading was taken from the vertical manometer and converted to a flow rate using the equipment calibration table. While other nonwoven chemically overall bonded webs are available of synthetic polymers such as polyolefins, polyesters, and the like, nylon webs, in the structure of the present invention are particularly advantageous in that they may easily be printed and resist discoloration or staining thus extending the useful life of the mat.

The absorbent microfiber layer structure is also an essential feature of the present invention. It preferably combines an intimate admixture of thermoplastic microfibers with other fibers such as wood pulp or natural or synthetic staple fibers having a basis weight in the range of from about 100 to 500 grams per square meter, preferably about 150 to 250 grams per square meter. The composition may range from about 0 to 80 percent of the other fibers, and is preferably in the range of from about 60 to 80 percent wood pulp fibers by weight. The microfibers are preferably thermoplastic polymers such as polyolefins, polyesters or polyamides having a diameter on the average in the range of up to about 15 microns and, preferably, in the range of up to about 10 microns.

The absorbent layer may be and is preferably formed in accordance with the process described in U.S. Pat. No. 4,100,324 to Anderson, Sokolowski and Ostermeier dated July 11, 1978, which is incorporated herein by reference in its entirety. Thus, a matrix of meltblown microfibers is formed by depositing streams of molten polymer into an airstream and combining is accomplished by a secondary airstream containing, for example, wood pulp fibers. The combination of the airstreams causes the wood pulp fibers to be distributed throughout and held within the microfiber matrix. Preferred materials for the meltblown microfiber component include polyolefins such as polypropylene and polyethylene, although other microfibers may be used as will be apparent to those skilled in the art. If staple fibers are included, they may be polyester, polyolefins, polyamides or mixtures thereof, for example. However constituted, the absorbent microfiber web will have an absorbent capacity such that the capacity for the mat product will be generally in the range of at least about 1,000 gsm preferably at least about 1,400 gsm, absorbency rate generally in the range of up to about 2.5 seconds, preferably no greater than 0.5 seconds, and wicking rate generally so as to provide results for the mat combination in the range of at least about 100 quarter inch squares and preferably about at least 200 quarter inch squares. Absorbency capacity was determined essentially in accordance with Federal Specification UU-T-00595(GSA-FSS) Sections 4.4.4 and 4.4.6 by submerging a sample in water for 3 minutes, removing it, and allowing it to drip for 1 minute. Absorbency rate was determined essentially in accordance with Federal Specification UU-P-31b, Mar. 3, 1949, Method 180 by measuring the time taken for a sample to completely absorb 0.1 ml. water. Wicking rate results were obtained by placing a 12 inch by 12 inch sample on a plexiglass surface, holding a pipet containing 5.0 ml of a solution of 0.02% aqueous FD&C red #4 dye 2 cm above the sample, and allowing the solution to flow vertically onto the sample. After five minutes, the number of quarter inch squares of area covered by the solution was measured. For the mat as a whole, the absorbency rate is generally within the range of up to 20 seconds, and, preferably, up to 10 seconds.

The liquid impervious surface for the combination in accordance with the invention is preferably a film selected from those which are suitable for combination with the other layers and yet provide the desired barrier properties. Such include, by way of example and not limitation, thermoplastic polymers such as polyolefins, polyesters and the like. Preferred for economic reasons as well as for improved bonding are polyethylene or polypropylene films. The film will, in general, have a thickness in the range of from about 0.5 to 5 mils, preferably in the range of from about 0.75 to 1.5 mils for the best combination of economics and performance. Essentially the film will need to be thick enough to withstand being subjected to repeated treading without breaking or rupturing and yet should be thin enough so as to not impart undue rigidity to the structure. The film may be applied as a separate layer, coextruded, or coated onto the absorbent web. Alternative means may be used to obtain imperviousness, such as calendering the exposed absorbent surface, or the bottom adhesive layer may be impervious.

Since the intended application as a floor mat will subject the combination to wet or otherwise slippery conditions, it is preferred that some means be provided to assure that the mat will maintain its position and not slip on the floor. This may be accomplished by means of a holder device or, more economically, by means of tacky adhesive applied to the exposed surface of the liquid impervious film. Such adhesives may be selected from those pressure-sensitive adhesives which are known to retain their tack for an extended period under wet conditions. Such include, for example, latex acrylic adhesives. Preferably the adhesive constitutes Nacor-38-4529 acrylic latex available from National Starch and is applied overall or in a pattern covering up to about 100 percent of the exposed surface and is such as to result in easy releasability when it is desired to change the mat. For further discussion of such adhesives, reference may be had to U.S. Pat. No. 4,421,809 to Bish, Sagel, and Trinh, for example, beginning at column 6, line 19, which is incorporated herein by reference.

When a holder is desired, it may be one of those known for use in holding floor mats. As such, it will generally have bevelled edges and be of a size such as to accommodate the mat without being so large as to permit the mat to be easily dislodged. If desired, retaining means may be incorporated in the holder to further ensure against undesired separation, or the mat may include an adhesive as above described for attachment to the holder. Other attachment means may be employed as will be apparent to those skilled in the art. If an adhesive is used, it will preferably be a permanently tacky pressure sensitive adhesive of the type described above and a release liner will preferably be used to protect the adhesive prior to the mat being placed in position. When it is desired to secure the mat, the release liner is removed, and the mat pressed into a desired position. Such release liners are known and may include plastic sheets such as 1 mil thick polyethylene or a spunbonded nonwoven of 0.5 oz/square yard, for example, or paper treated with a release coat of silicone, polytretrafluoroethylene or other strippable material.

Bonding of the composite may be accomplished by a variety of means including adhesives, heat and pressure, stitching or application of sonic energy. It is important, however, that bonding be accomplished in a manner that does not adversely affect the wear resistant properties of the spunbonded top surface or the absorbency and wicking properties of the microfiber mat. Also, since the spunbonded surface must transmit liquid into the absorbent layer, the bonding must preserve the porosity or open structure of the web. Therefore, bonding is achieved in a pattern that will generally occupy up to about 25 percent of the surface and, preferably, up to about 10 percent of the surface. The pattern may comprise an open, disconnected pattern, or it may comprise a series of lines. If an open, disconnected pattern is used, it will generally be in a pattern of up to about 30 bonds per square inch and preferably have up to about 20 bonds per square inch. If a line pattern is used, it will generally be in a pattern of up to about 10 lines per inch on the average in any direction and preferably average up to about 5 lines per inch in any direction. The preferred means for achieving bonding is application of sonic energy since that has been found to be most effective for combinations of the total basis weight of the present invention and for achieving bonding of different polymer components. For some applications, combinations of the different bonding steps may be employed.

Turning to the drawings, FIG. 1 illustrates a mat in accordance with the present invention shown in partial cross-section. As illustrated, the mat 20 includes wear surface spunbonded layer 10, absorbent layer 12 including microfibers 22 and wood pulp fibers 24 and liquid impervious film 14. The combination is united by bond areas 16 and includes adhesive strips 18 for attachment to the floor surface.

Figure 2:
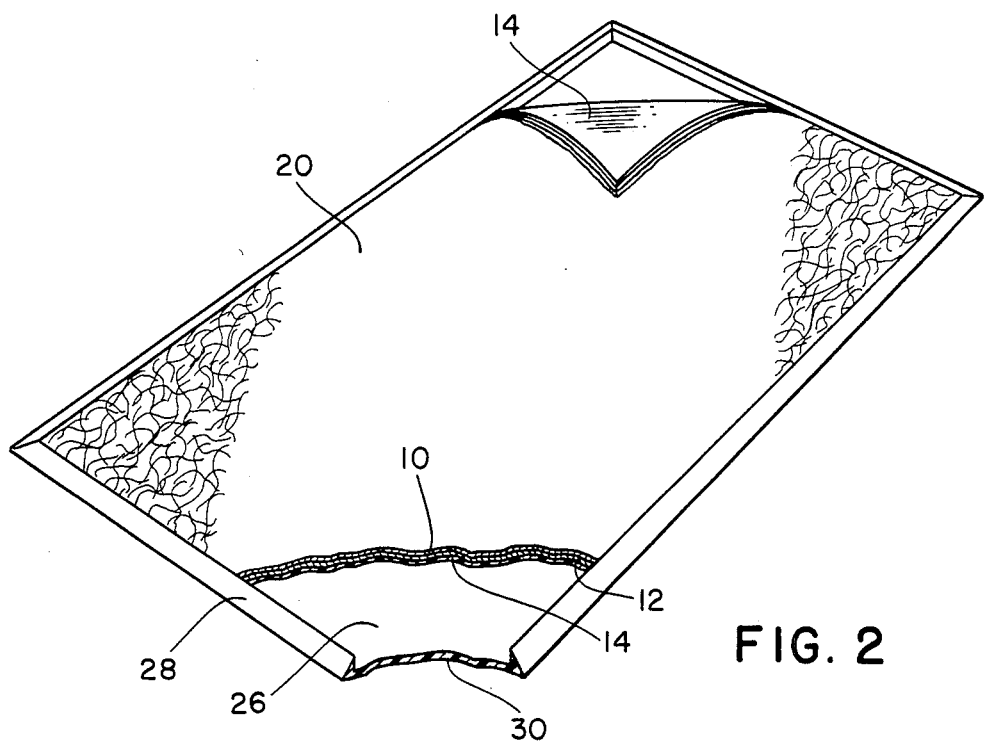
FIG. 2 is a view like that of FIG. 1 showing the mat in combination with a holder. DESCRIPTION OF THE PREFERRED EMBODIMENTS The present invention provides an improved floor mat that is highly absorbent and finds applications as protection at building entryways, clean rooms, laboratories, hospitals, and the like where there is high traffic likely to bring in water, dirt, or other contaminants. The floor mat of the present invention is highly effective yet may be produced at a low cost consistent with disposability. Thus, the mat may include graphics of widely varying descriptions including advertisements, logos, and the like which may be changed frequently. These benefits and advantages are attained as a result of the specific structure of the mat which combines an abrasion-resistant nonwoven wear layer with a highly absorbent microfiber inner layer which may include cellulose or other fibers in combination with a bottom surface or film that is liquid impervious. In preferred embodiments the structure also includes means for retaining the mat either such as through the use of adhesives and/or a mat holder. The combination may be bonded by various means but is preferably bonded by a patterned application of sonic energy or heat and pressure.

FIG. 2 is a view like that of FIG. 1 further illustrating the embodiment wherein the mat 20 is combined with holder 26 which may be of a variety of materials suited for the intended use. Thus, if intended as a permanent embodiment, the support holder 26 may be of a durable material such as rubber or, if used only temporarily, may be of a less expensive material such as polystyrene, polypropylene, polyurethane or the like. In any event, holder 26 preferably includes bevelled sides 28 and will have a gripping under surface 30 to avoid slipping on a wide variety of floor surfaces, such as carpet, tile, linoleum, concrete, wood and so forth. In this application, as shown, the impervious surface 14 may be free of adhesive, or, if desired, adhesive may be used to secure the mat to the holder.

The mats of the present invention either alone or in combination with the holder, will find a wide variety of applications. For example, they may be used as either temporary or permanent fixtures at building entryways to protect against inclement weather or otherwise tracking in outside dust and dirt. Also they may be employed in industrial applications at entryways to cleanrooms, laboratories, or as undermats for automotive repair. Further, they may be used in hospitals to reduce opportunities for contamination. Other uses including household applications will be apparent to those skilled in the art. For many of these applications the particular advantage of the printability of a nylon or other receptive outer surface may be used to achieve advertising or other promotional purposes such as safety messages or the like. The low cost of the mats in the present invention make them particularly suitable since they may be changed to impart different messages on a relatively frequent basis.

EXAMPLE

A mat in accordance with the present invention was constructed generally as illustrated in FIG. 1. For the outside wear surface, a nylon web obtained from Monsanto under the trademark Cerex ® was used. This web was formed of chemically bonded 3 denier continuous nylon filaments and had a basis weight of 68 grams per square meter and a porosity of 140 cubic feet per minute. For the absorbent layer a web produced generally in accordance with U.S. Pat. No. 4,100,324 to Anderson, Sokolowski and Ostermeier and, in particular, with reference to Example 1, was employed. This layer had a basis weight of 190 grams per square meter and included 30 percent polypropylene microfibers and 70 percent wood pulp. It had an absorbency rate that was essentially instantaneous. For the liquid impervious film layer, a film of polyethylene having a basis weight of about 31 grams per square meter and thickness of 1.5 mils was employed. The combination was bonded by application of sonic energy at a frequency of 20 to 40 kilohertz and in a pattern corresponding to the gross pattern illustrated in U.S. Pat. No. 4,374,888 to Bornslaeger dated Feb. 22, 1983, FIG. 3 having a frequency of about 20 bonds per square inch and percent coverage of about 8 percent. The surface of the mat was printed with a decorative pattern.

In use the mat of this Example was placed in a rectangular holder and located at the entryway to offices and factories in the northeast section of the United States during a period of highly inclement weather including two blizzards and one week of rain for a total precipitation of about 15 inches. After a period of 31 days with an estimated traffic of 3,000 to 5,000 persons, the mat was still fully intact although the appearance had deteriorated due to dirt retention.

The mat material of this example was further tested to determine its absorbency capacity and wicking rate. For comparison, similar tests were performed on other conventional paper and nondisposable cloth mat materials. The results are shown in the following Table.

TABLE

| Sample | Water Rate (Seconds) | Water Capacity gsm | Wicking ¼" squares | Tetrapod |
|---|---|---|---|---|
| Paper (117.6 gsm) | 13.4 | 187.6 | 754 | 3 hours - one hole considerable wear |
| Calendered Paper (92.1 gsm) | Did not absorb | 92.4 | Did not absorb | 5 hrs.* |
| Calendered Paper (117 gsm) | 11.9 | 199.3 | 579 | 5 hrs.* |
| Paper (83.7 gsm) | 0.3 | 823.6 | 136 | 1 hour - failed holes |
| Paper (306.1 gsm) | 19.7 | 1881.6 | 50 | 1 hr 10 min failed - holes - much pilling |
| Air Laid Paper (75.6 gsm) | Instant | 694.3 | 167 | 5 min - failed - holes |
| Rental-Cotton (3022 gsm) | 37.2 | 3701.9 | Essentially** Zero | 5 hrs - some pilling, no holes |
| Rental-Nylon (2660 gsm) | 35.3 | 4022.0 | Essentially** Zero | Not done |
| Rental-Cotton Used (2011 gsm) | 40.0 | 2257.0 | 31 | Not done |
| Example (315 gsm) | 7.1 | 1487.8 | 143 | 5 hrs - some pilling, no holes |

*Due to paper being highly calendered, test results are not believed to reflect true abrasion resistance.
**"Z" directional transfer only.

These data demonstrate that the mats of the present invention provide benefits approaching and, in some cases, exceeding those of the more expensive reusable cloth ones at a cost consistent with disposability. While individual results in some cases do not measure up to those of competitive disposable products, taken as a whole, and particularly as shown by tests in use, the floor mats of the present invention are preferred over such conventional disposable products. The engineered construction of the mats of the present invention extend performance by wicking liquid and soil contained therein away from the exposed surface while preventing its transfer through the impervious bottom surface. The top wear layer protects the absorbent medium while permitting the soil to penetrate to avoid surface build-up and further contributes to extend the useful life of the mat.

Thus it is apparent that there has been provided, in accordance with the invention, an improved floor mat construction that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:
1. An improved, low cost, absorbent mat comprising,
   (a) an absorbent inner layer having a basis weight generally in the range of from about 100 to 500 grams per square meter comprising microfibers having absorbency rate in the range of up to about 2.5 seconds,
   (b) on one side of said inner layer, a wear surface comprising a chemically bonded, continous filament nonwoven web having a basis weight generally in the range from about 15 to 200 g/sq. meter and an abrasion resistance of at least about 3½ hours, and
   (c) on the side of said inner layer opposite from said wear surface, a liquid impervious film surface.
   said mat being bonded by a spaced pattern of bond areas occupying up to about 25 percent of the surface area and having an absorbent capacity in the range of at least about 1000 gsm and a wicking rate in the range of at least about 100 quarter-inch squares.

2. The mat of claim 1 wherein said absorbent inner layer comprises an admixture of meltblown polypropylene microfibers with up to 80% of additional larger fibers selected from the group consisting of staple fibers and wood pulp fibers.

3. The mat of claim 1 wherein said wear surface comprises nylon filaments and has an abrasion resistance of at least about 5 hours.

4. The mat of claim 1 wherein said liquid impervious surface is a polymeric film having a thickness in the range of from about 0.5 to 5 mils.

5. The mat of claim 4 wherein the film is a polyethylene film having a thickness in the range of from about 0.75 to 1.5 mils.

6. The mat of claim 1 in combination with means to maintain its position.

7. The mat of claim 6 wherein said maintaining means is a pressure-sensitive adhesive applied to the impervious surface.

8. The mat of claim 6 wherein said maintaining means is a holder to contain said mat.

9. A limited life, low cost protective mat consisting essentially of,
   (a) a microfiber inner layer having a basis weight in the range of from about 150 to 250 grams per square meter and comprising an admixture with 0 to 80% of other fibers selected from the group consisting of wood pulp fibers and staple fibers and mixtures containing wood pulp and staple fibers, said mat component having an absorbency capacity in the range of from about 300 to 500 g/sq. ft. and absorbency rate in the range of up to about 0.5 sec., (b) on one side of said inner layer a wear surface comprising a nonwoven of chemically bonded continuous nylon filaments having a basis weight in the range of from about 1.5 to 2.0 oz/yds$^2$, abrasion resistance of at least about 5 hours, and porosity in the range of from about 140 to 500 cubic feet per minute, and (c) on the side of said inner layer opposite said wear surface an impervious surface comprising a synthetic polymer film having a thickness of about 0.75 to 1.5 mils, said inner layer, wear surface, and film being combined by a pattern of bond areas occupying up to about 10% of the surface area and the combination further including means selected from the group consisting of holders and pressure sensitive adhesives for maintaining the mat in position and having a wicking rate in the range of at least about 100 quarter-inch squares.

* * * * *